United States Patent
Hayashi et al.

(10) Patent No.: US 11,280,989 B2
(45) Date of Patent: Mar. 22, 2022

(54) DISK SCANNING MICROSCOPE SYSTEM AND COMPUTER-READABLE RECORDING MEDIUM

(71) Applicant: OLYMPUS CORPORATION, Hachioji (JP)

(72) Inventors: Shinichi Hayashi, Tokyo (JP); Hirofumi Takatsuka, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 609 days.

(21) Appl. No.: 16/221,575

(22) Filed: Dec. 16, 2018

(65) Prior Publication Data

US 2019/0187447 A1   Jun. 20, 2019

(30) Foreign Application Priority Data

Dec. 20, 2017   (JP) .............................. JP2017-243442

(51) Int. Cl.
*G02B 21/00* (2006.01)
*G02B 21/36* (2006.01)
*G02B 27/58* (2006.01)

(52) U.S. Cl.
CPC ..... *G02B 21/0036* (2013.01); *G02B 21/0032* (2013.01); *G02B 21/0044* (2013.01);
(Continued)

(58) Field of Classification Search
CPC ............ G02B 21/0036; G02B 21/0072; G02B 21/361; G02B 21/0044; G02B 27/58;
(Continued)

(56) References Cited

U.S. PATENT DOCUMENTS

2003/0021017 A1   1/2003   Eijsackers et al.
2004/0170312 A1   9/2004   Soenksen
(Continued)

FOREIGN PATENT DOCUMENTS

JP   H09230245 A   9/1997
JP   2003084209 A   3/2003
(Continued)

OTHER PUBLICATIONS

Extended European Search Report (EESR) dated Jun. 7, 2019 issued in counterpart European Application No. 18212929.6.
(Continued)

*Primary Examiner* — Stephone B Allen
*Assistant Examiner* — Rahman Abdur
(74) *Attorney, Agent, or Firm* — Holtz, Holtz & Volek PC (57) ABSTRACT

A system includes an imaging optical system that forms an optical image of an observed object; a control apparatus that switches between a superresolution observation mode and a normal observation mode; and a rotatable disk located at a position conjugate to a front focal position of the imaging optical system and having a plurality of apertures. The imaging optical system changes a projection magnification of an intermediate image that is a point image of a portion of the observed object that is formed on the disk. The control apparatus sets, during the superresolution observation mode, the projection magnification in a manner such that the intermediate image becomes at least twice as large as the apertures and sets, during the normal observation mode, the projection magnification in a manner such that the projection magnification becomes lower than the projection magnification in the superresolution observation mode.

12 Claims, 7 Drawing Sheets

(52) U.S. Cl.
CPC ..... *G02B 21/0052* (2013.01); *G02B 21/0072* (2013.01); *G02B 21/0076* (2013.01); *G02B 21/361* (2013.01); *G02B 21/365* (2013.01); *G02B 27/58* (2013.01)

(58) Field of Classification Search
CPC ............ G02B 21/0052; G02B 21/0076; G02B 21/0032; G02B 21/365
USPC ........................................................ 359/385
See application file for complete search history.

(56) References Cited

U.S. PATENT DOCUMENTS

| | | | |
|---|---|---|---|
| 2012/0081535 | A1 | 4/2012 | Hayashi |
| 2014/0036057 | A1* | 2/2014 | Hayashi ............. G02B 21/0076 348/79 |
| 2015/0181094 | A1* | 6/2015 | Fujii .................... G02B 21/008 348/79 |

FOREIGN PATENT DOCUMENTS

| | | |
|---|---|---|
| JP | 2003233010 A | 8/2003 |
| JP | 2012078408 A | 4/2012 |
| JP | 2015079153 A | 4/2015 |
| JP | 2016167080 A | 9/2016 |

OTHER PUBLICATIONS

Chen, et al., "A novel method for enhancing the lateral resolution and image SNR in confocal microscopy", Optics Communications, Dec. 1, 2017, vol. 404, pp. 184-188.

Wilson, "Resolution and opetical sectioning in the confocal microscope: Properties of the Fluorescent Confocal Microscope", Journal of Microscopy, Nov. 1, 2011, vol. 244, pp. 113-121.

Japanese Office Action (and English language translation thereof) dated Nov. 30, 2021, issued in counterpart Japanese Application No. 2017-243442.

* cited by examiner

DISK SCANNING MICROSCOPE SYSTEM AND COMPUTER-READABLE RECORDING MEDIUM

CROSS REFERENCE TO RELATED APPLICATIONS

This application is based upon and claims the benefit of priority from prior Japanese Patent Application No. 2017-243442, filed Dec. 20, 2017, the entire contents of which are incorporated herein by this reference.

BACKGROUND OF THE INVENTION

Field of the Invention

The present invention relates to a disk scanning microscope system for obtaining a superresolution for an observed object and a computer-readable recording medium having stored therein a program for controlling this system.

Description of the Related Art

A disk scanning microscope is a microscope that includes a confocal plate (disk) provided at a position conjugate to the focal position of an imaging optical system and having a plurality of apertures in the surface of the plate. The microscope can obtain information only on a focused-on position and sequentially obtain optical images of different portions in an observed object via the disk by rotating the disk, thereby enabling fast observation.

It is known that making the apertures in the disk sufficiently small relative to an Airy disk diameter allows light including frequency components (superresolution components) exceeding a cut-off frequency to be obtained. In particular, it is considered that to obtain superresolution components, the aperture diameter is desirably ½ of the Airy disk diameter or less.

Japanese Laid-open Patent Publication No. 2012-78408 discloses a technique related to a disk scanning microscope and indicates an example in which the aperture width of a scan mask is less than a size defined according to a cut-off frequency of an imaging optical system.

SUMMARY OF THE INVENTION

A disk scanning microscope system in accordance with an aspect of the present invention includes: an imaging optical system that forms at least an optical image of an observed object by receiving light from the observed object; a control apparatus that switches, on the basis of an input from a user, between a superresolution observation mode for performing a superresolution observation and a normal observation mode for performing a normal observation and that controls the imaging optical system according to a selected mode; and a rotatable disk located at a position conjugate to a front focal position of the imaging optical system and having a plurality of apertures formed in a surface of the disk, the surface of the disk serving as a light blocking section, wherein the imaging optical system includes an intermediate scaling optical system that changes a projection magnification of an intermediate image that is a point image of a portion of the observed object that is formed on the disk, and the control apparatus sets, during the superresolution observation mode, the projection magnification of the intermediate image in a manner such that the intermediate image becomes at least twice as large as the apertures and sets, during the normal observation mode, the projection magnification of the intermediate image in a manner such that the projection magnification becomes lower than the projection magnification of the intermediate image in the superresolution observation mode.

A non-transitory computer-readable recording medium in accordance with an aspect of the present invention has stored therein a program for causing a control apparatus to execute a process. The process includes controlling an imaging optical system according to a selected mode from among a superresolution observation mode for performing a superresolution observation and a normal observation mode for performing a normal observation, the imaging optical system switching, on the basis of an input from a user, between the superresolution observation mode and the normal observation mode, the imaging optical system forming an optical image of an observed object by receiving light from the observed object, the imaging optical system including an intermediate scaling optical system that changes a projection magnification of an intermediate image that is a point image of a portion of the observed object that is formed on a rotatable disk, the disk being located at a position conjugate to a front focal position of the imaging optical system and having a plurality of apertures formed in a surface of the disk, the surface of the disk serving as a light blocking section; and setting, during the superresolution observation mode, the projection magnification of the intermediate image in a manner such that the intermediate image becomes at least twice as large as the apertures, and setting, during the normal observation mode, the projection magnification of the intermediate image in a manner such that the projection magnification becomes lower than the projection magnification of the intermediate image in the superresolution observation mode.

BRIEF DESCRIPTION OF THE DRAWINGS

The present invention will be more apparent from the following detailed description when the accompanying drawings are referenced.

DESCRIPTION OF THE EMBODIMENTS

In using a disk scanning microscope while switching between a superresolution observation for obtaining an image including superresolution components and a normal observation, a user needs to perform, for every switching operation to be performed, an adjustment task to achieve an appropriate magnification for projection onto a scan disk according to the observation to be performed. If the user forgets to perform such an adjustment task or accidentally sets an inappropriate magnification, an image including superresolution components cannot be obtained, and image shooting may need to be performed again, thereby leading to a time loss. There is also a problem that such an adjustment task itself associated with the switching of the observation method is cumbersome.

In view of the facts described above, it is desired to provide a disk scanning microscope system that allows a superresolution observation and a normal observation to be performed while switching between these observations and that eliminates the need for a user to make cumbersome adjustments.

Figure 1:
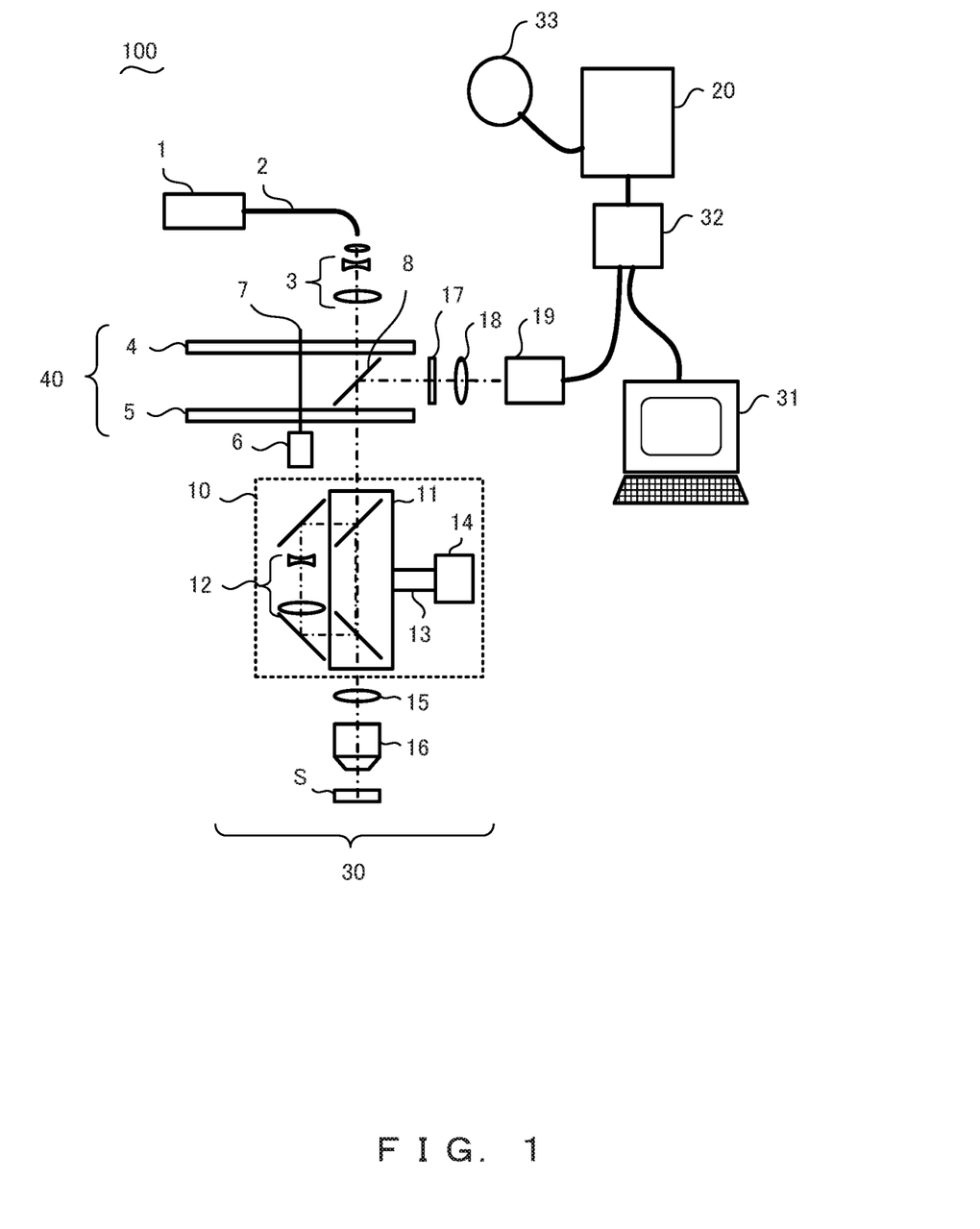
FIG. 1 illustrates the configuration of a disk scanning microscope system in accordance with a first embodiment.

The following describes a disk scanning microscope system 100 in accordance with a first embodiment. FIG. 1 illustrates the configuration of the disk scanning microscope system 100.

The disk scanning microscope system 100 includes a light source unit 1, an optical fiber 2, a beam expander 3, a confocal disk unit 40, an imaging optical system 30, an image capturing apparatus 19, a control apparatus 20, a monitor 31, an image processing board 32, and an external storage apparatus 33.

The light source unit 1 outputs illumination light for illuminating a sample S, i.e., an observed object. The optical fiber 2 guides illumination light from the light source unit 1. The beam expander 3 makes an adjustment such that an illumination light flux has an appropriate size.

The imaging optical system 30 emits illumination light to the sample S and receives light (fluorescence) from the sample S so as to form an optical image from the light. The image capturing apparatus 19 detects the optical image formed by the imaging optical system 30 and turns the detected optical image into an image such that the sample S can be observed.

The imaging optical system 30 includes a beam splitter 8, an intermediate scaling optical system 10, a lens 15, an objective 16, a fluorescence filter 17, and a lens 18.

The confocal disk unit 40 includes a microlens array disk 4, a confocal disk 5, a motor 6, and an axis 7. The microlens array disk 4 and the confocal disk 5 are integrally moved rotationally on the axis 7 by the motor 6. The microlens array disk 4 includes a plurality of apertures in a surface thereof, and the apertures each have a microlens disposed thereover. The confocal disk 5 includes a plurality of apertures in a surface thereof at positions directly below the apertures of the microlens array disk 4. In particular, the confocal disk 5 is positioned in a manner such that illumination light that has been sent via a microlens array of the microlens array disk 4 passes through the apertures of the confocal disk 5. Providing the microlens array disk 4 prevents illumination light from being blocked at regions on the surface of the confocal disk 5 excluding the apertures (from being blocked by a light blocking section), so that the lighting efficiency can be enhanced.

The confocal disk 5 has a plurality of apertures formed in the surface thereof, i.e., formed in the light blocking section thereof. The confocal disk 5 is, for example, a Nipkow disk with apertures arranged at certain intervals. The confocal disk 5 is rotated to function as a scan means for sequentially irradiating different portions of the sample S with illumination light. The confocal disk 5 is located at a position conjugate to a front focal position of the imaging optical system 30 and guides light (fluorescence) from an irradiated position to the image capturing apparatus 19 located on a subsequent stage via the beam splitter 8. More particularly, when the apertures of the confocal disk 5 are located on an optical path, all of the apertures are located at positions conjugate to the front focal position of the imaging optical system 30. Accordingly, only light generated at a focused-on position can be used for image capturing.

The intermediate scaling optical system 10 is provided between the lens 15 and the confocal disk 5 and is a mechanism that changes the projection magnification of an intermediate image that is a point image of an irradiated portion of an observed object formed on the surface of the confocal disk 5 by the objective 16 and the lens 15. The intermediate scaling optical system 10 includes a base 11, a lens group 12, a lever 13, a motor 14, and mirrors 11a, 11b, 12a, and 12b. The lens group 12 has a magnification for enlargement projection of light from a sample S.

Figure 2:
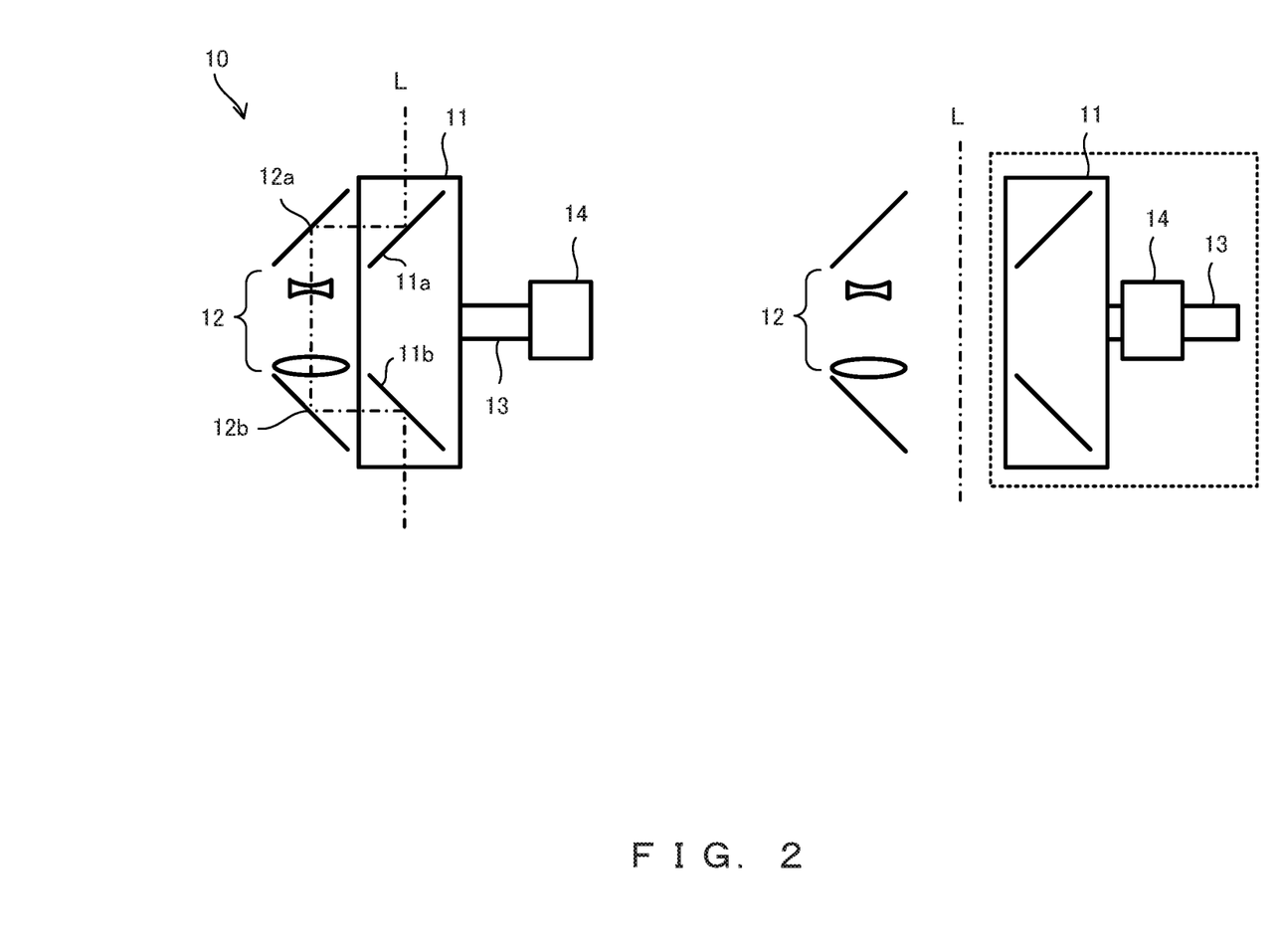
FIG. 2 illustrates operations of an intermediate scaling optical system in accordance with a first embodiment.

FIG. 2 illustrates operations of the intermediate scaling optical system 10. The base 11 supports the mirrors 11a and 11b and is coupled to the lever 13. The position of the base 11 is changed by the motor 14 moving the lever 13. Changing the position of the base 11 so as to place the mirrors 11a and 11b on an optical axis L of the objective 16 as depicted in the left side of FIG. 2 causes light to travel via the lens group 12 toward the confocal disk 5. Meanwhile, changing the position of the base 11 so as to remove the mirrors 11a and 11b from the optical axis L as depicted in the right side of FIG. 2 causes the light to travel without passing via the lens group 12.

Accordingly, driving the motor 14 of the intermediate scaling optical system 10 allows switching to be performed between a mode in which light from the sample S travels via the lens group 12 for enlargement projection onto the surface of the confocal disk 5 and a mode in which without passing via the lens group 12, the light travels for projection with no change in the magnification. In other words, the intermediate scaling optical system 10 is operated to switch between two optical systems that each provides a different projection magnification for an intermediate image formed on the surface of the confocal disk 5. It should be noted that the intermediate image is projected in a manner such that an image-formed position is not changed in an optical axis direction even when the two optical systems are switched over.

The intermediate scaling optical system 10 is designed in a manner such that a point image projected onto the surface of the confocal disk 5 that is formed from light passing via the lens group 12 has an Airy disk diameter that is at least twice as large as the aperture of the confocal disk 5. In a case where, for example, a point image obtained via projection based on light traveling without passing via the lens group 12, i.e., with no change the magnification, has about the same size as the aperture of the confocal disk 5, designing the lens group 12 to have a 2-fold projection magnification or greater provides a point image that is twice as large as the aperture.

It is known that making the diameter of an aperture located at a position onto which a point image is projected sufficiently small relative to an Airy disk diameter (desirably ½ of the Airy disk diameter or smaller) typically allows light containing frequency components exceeding the cutoff frequency of the apparatus (superresolution components) to be obtained. Hence, in the configuration of the intermediate scaling optical system 10 described above, when the base 11 is located on the optical path so as to cause light to travel via the lens group 12, image capturing can be performed with light containing superresolution components. Meanwhile, when the base 11 is removed, a point image that is one time as large as the aperture is projected so that a normal confocal observation can be performed while limiting a light loss. Accordingly, the imaging optical system 30 allows an observation for obtaining superresolution images and a normal observation to be switched between by operating the intermediate scaling optical system 10 on an as-needed basis.

The fluorescence filter 17 blocks light of a frequency that is different from that of fluorescence for image capturing. The lens 18 forms an image on the image capturing apparatus 19 with light from the sample S. The image capturing apparatus 19 is more distant from the sample S than the confocal disk 5 is and located at a position conjugate to a focal position of the objective 16.

The control apparatus 20 is a computer for controlling the imaging optical system 30. During, for example, image processing, the control apparatus 20 may use the image processing board 32 connected thereto or may record data in an external storage apparatus 33.

The monitor 31 displays an image output from the control apparatus 20.

Figure 3:
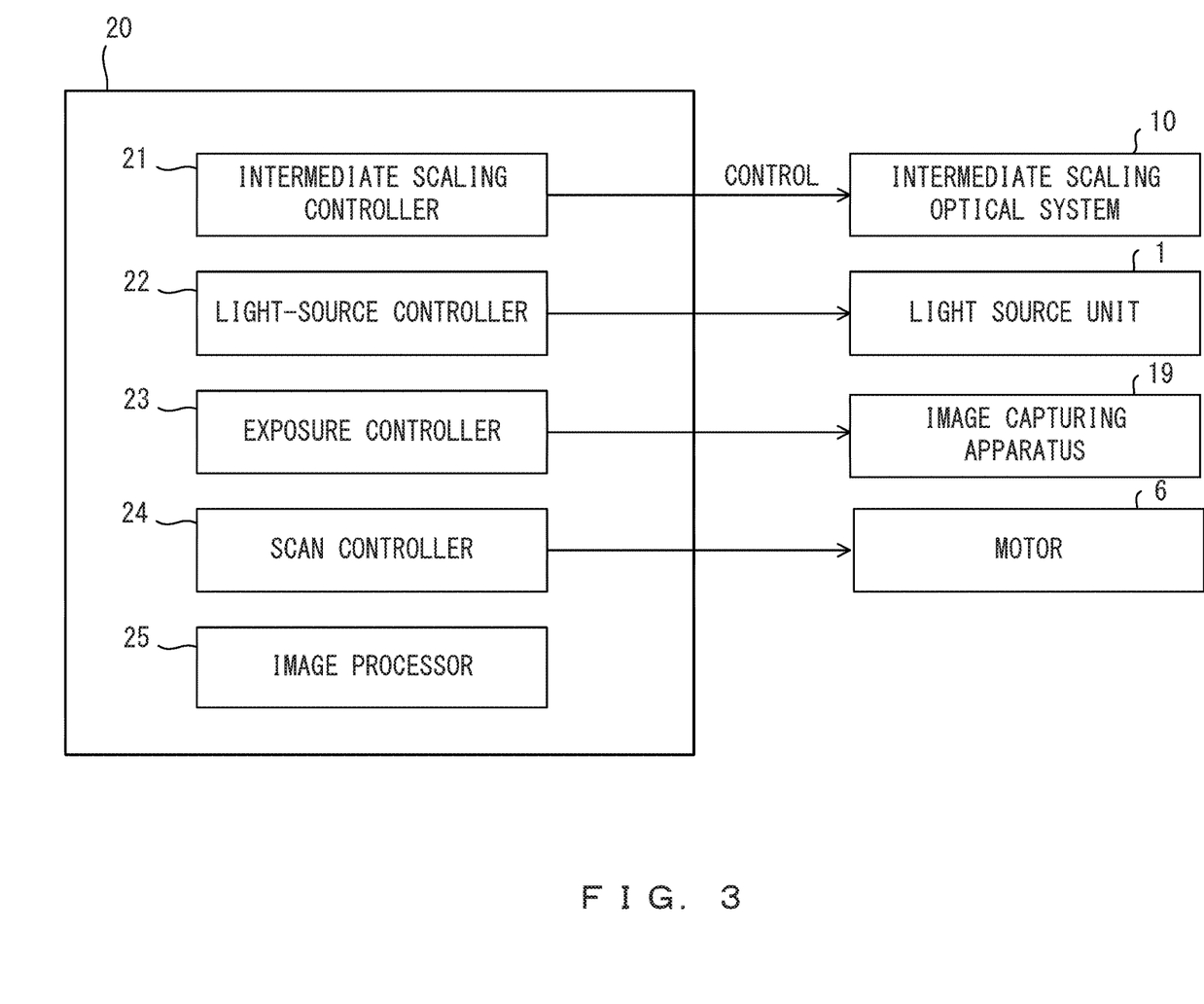
FIG. 3 illustrates the functional configuration of a control apparatus.

FIG. 3 illustrates the functional configuration of the control apparatus 20. The control apparatus 20 includes an intermediate scaling controller 21, a light-source controller 22, an exposure controller 23, a scan controller 24, and an image processor 25.

The intermediate scaling controller 21 controls the intermediate scaling optical system 10 within the imaging optical system 30. More particularly, on the basis of a user input from an input apparatus such as a keyboard connected to the control apparatus, the intermediate scaling controller 21 switches between a superresolution observation mode for performing a superresolution observation and a normal observation mode for performing a normal observation and controls the motor 14 within the intermediate scaling optical system 10 in accordance with a selected mode.

The superresolution observation mode is one control mode wherein an image containing superresolution components is captured and subjected to image processing performed by the image processor 25 (this will be described hereinafter) so as to obtain an image with the superresolution components visualized. Accordingly, upon receipt of an input for selecting the superresolution observation mode from the user, the intermediate scaling controller 21 controls the motor 14 so as to place the lens group 12 on the optical path.

The normal observation mode is one control mode wherein a normal observation is performed without obtaining superresolution components. Upon receipt of an input for selecting the normal observation mode from the user, the intermediate scaling controller 21 controls the motor 14 so as to remove the lens group 12 from the optical path.

As described above, in the disk scanning microscope system 100 with the function of the intermediate scaling controller 21, the magnification of the intermediate scaling optical system 10 is automatically adjusted in accordance with the switching of the observation mode. This eliminates the need for a user to change the magnification of the intermediate scaling optical system 10 so that a system reducing the burdens on the user can be achieved. In, for example, a case where the intermediate scaling optical system 10 needs to be manually adjusted, if the user forgets to make the adjustment, or if an inappropriate magnification is mistakenly set, an image containing superresolution components cannot be obtained, leading to a time loss due to the performing of image shooting again or the like. Providing the intermediate scaling controller 21 allows such a human error to be prevented from occurring.

The light-source controller 22 controls the ON and OFF of the light source unit 1 and the changing of the intensity of illumination light (intensity of illumination) output by the light source unit 1. The light-source controller 22 desirably defines the intensity of illumination of the light source unit 1 for each of the superresolution observation mode and the normal observation mode and sets the intensity of illumination to the defined value in accordance with the switching between the superresolution observation mode and the normal observation mode. In the superresolution observation mode, for example, the light-source controller 22 may set an intensity of illumination that is greater than that in the normal observation in consideration of alight loss resulting from an intermediate image exceeding the size of the aperture.

The exposure controller 23 controls an exposure time of the image capturing apparatus 19. The exposure controller 23 desirably defines the exposure time of the image capturing apparatus 19 for each of the superresolution observation mode and the normal observation mode and sets the exposure time to the defined value in accordance with the switching between the superresolution observation mode and the normal observation mode. The reason for this is similar to that for the light-source controller 22. In the superresolution observation mode, the exposure controller 23 may set an exposure time longer than that in the normal observation in consideration of a light loss in the superresolution observation mode. More particularly, the light-source controller 22 and the exposure controller 23 desirably define an intensity of illumination and an exposure time such that the image capturing apparatus 19 captures images with a defined luminance value in both the normal observation mode and the superresolution observation mode.

The scan controller 24 rotates the microlens array disk 4 and the confocal disk 5 by controlling the motor 6, so as to scan the sample S with illumination light.

During the superresolution observation mode, the image processor 25 performs a process of highlighting frequency components within an image captured by the image capturing apparatus 19 that exceed a cutoff frequency of the imaging optical system 30. During the superresolution observation mode, the image processor 25 makes the superresolution components within an image visible.

Figure 4:
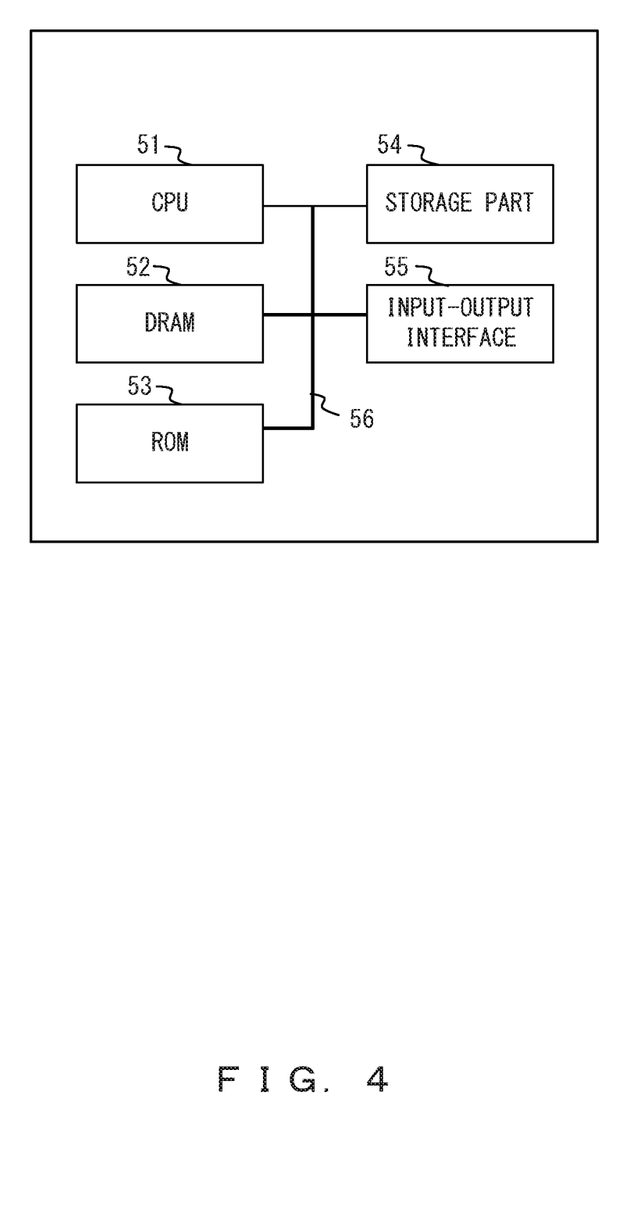
FIG. 4 illustrates the hardware configuration of a control apparatus.

FIG. 4 illustrates the hardware configuration of the control apparatus 20. The hardware configuration includes a CPU 51, a DRAM 52, a ROM 53, a storage part 54, and an input-output interface 55.

The CPU 51 reads and executes various control programs stored in the ROM 53.

The DRAM 52 provides a working area for temporarily storing control programs and various types of data. The ROM 53 is a storage medium that stores various control programs in a nonvolatile manner.

The storage part 54 stores programs and image data and includes a flash memory and a hard disk. The input-output interface 55 transmits/receives data to/from elements outside the hardware. These components are connected by a bus 56.

Figure 5:
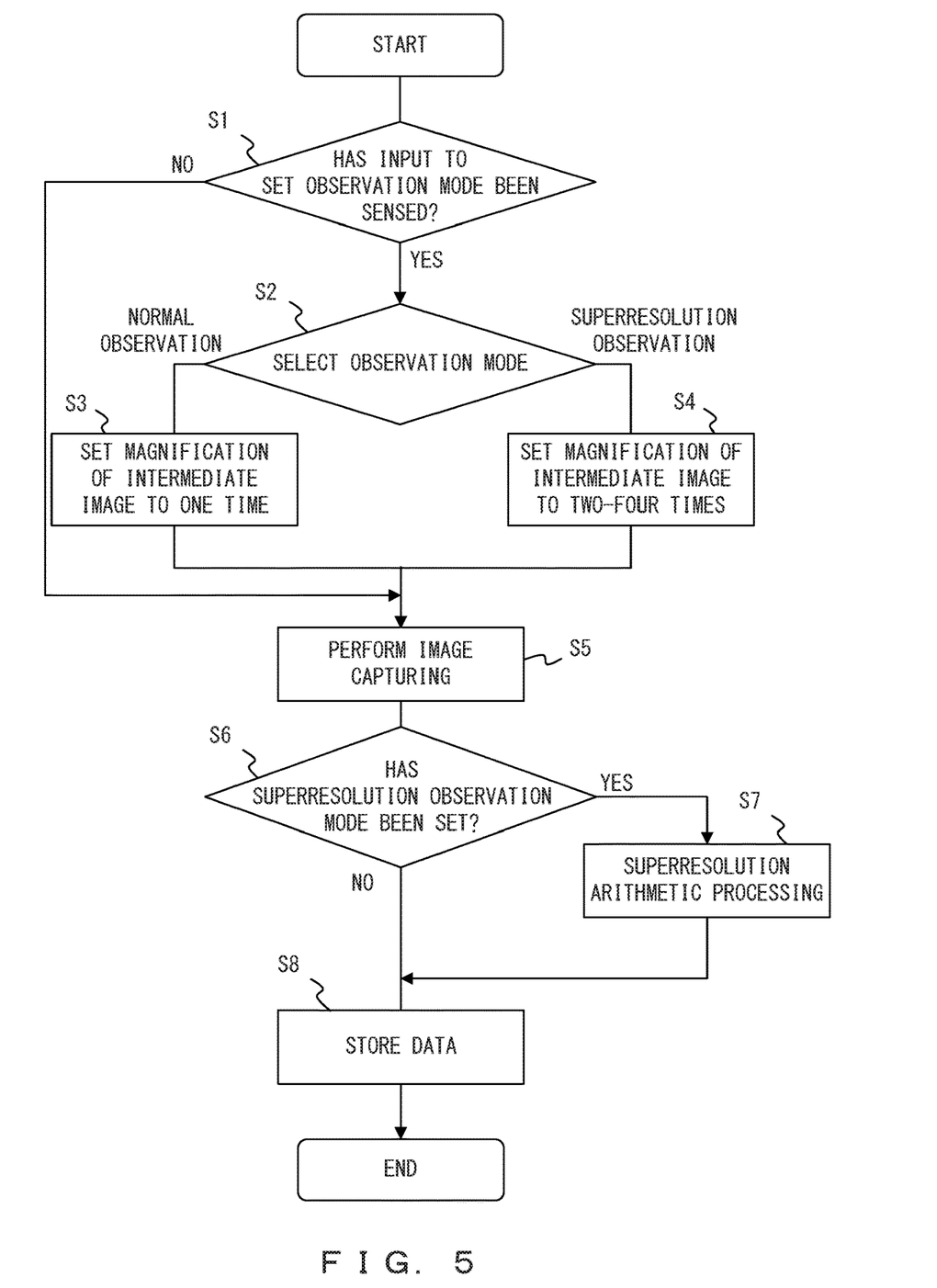
FIG. 5 is a flowchart of control of a disk scanning microscope system performed by a control apparatus in the capturing of an image of a sample.

FIG. 5 illustrates a flowchart of control of the disk scanning microscope system 100 performed by the control apparatus 20 in the capturing of an image of a sample S. The following describes the flowchart depicted in FIG. 5.

In step S1, the control apparatus 20 determines whether a user has provided an input for setting an observation mode. When an input is sensed in step S1, the control apparatus 20 sets, in step S2, an observation mode on the basis of the input. When the normal observation mode is set in step S2, the flow shifts to step S3, and when the superresolution observation mode is set in step S2, the flow shifts to step S4. When an input is not sensed (or when an input to the effect that an observation mode is not to be set is received) in step S1, the flow shifts to step S5.

To start the flowchart of FIG. 5, the control apparatus 20 sets a default observation mode in advance. For example, the normal observation mode may be set in advance, and the normal observation mode may be maintained when an observation mode is not input in step S1.

In step S3, the intermediate scaling controller 21 controls the intermediate scaling optical system 10 (motor 14) in a manner such that the projection magnification of an intermediate image is one time. In particular, the intermediate scaling controller 21 removes the lens group 12 from an optical path of the imaging optical system 30 by controlling the motor 14.

In step S4, the intermediate scaling controller 21 controls the intermediate scaling optical system 10 (motor 14) in a manner such that the projection magnification of the intermediate image is two times or higher (a projection magnification set by the lens group 12). In particular, the intermediate scaling controller 21 places the lens group 12 on the optical path of the imaging optical system 30 by controlling the motor 14.

In step S5, the control apparatus 20 performs a control to perform image capturing. In particular, the light-source controller 22 controls the light source unit 1 so as to emit illumination light with an intensity of illumination that has been set, and the exposure controller 23 controls the image capturing apparatus 19 so as to perform exposures for the duration of an exposure time that has been set. In this case, the intensity of illumination and the exposure time are defined as described above by the light-source controller 22 and the exposure controller 23 in advance for each observation mode and are desirably controlled by the control apparatus 20 in accordance with a current observation mode. When image capturing is ended in step S5, the flow shifts to step S6.

In step S6, the control apparatus 20 determines whether the current observation mode is the superresolution observation mode. When the current mode is the superresolution observation mode, the flow shifts to step S7, where the image processor 25 performs image processing to highlight superresolution components.

When it is determined in step S6 that the current mode is not the superresolution observation mode, or when the superresolution processing of step S7 has been ended, the flow shifts to step S8. In step S8, the control apparatus 20 stores obtained image data in a storage region within the control apparatus 20 or the external storage apparatus 33 and ends the process.

The disk scanning microscope system 100 described above can allow the superresolution observation and the normal observation to be performed while switching between these observations and eliminate the need for a user to change the magnification of the intermediate scaling optical system 10 since the magnification is automatically adjusted in response to the switching of the observation mode. In terms of the fact that a human error related to the changing of a magnification would not occur, the present invention also allows efficient observations to be achieved in comparison with the prior art.

In the described embodiments, the projection magnification of the lens group 12 that serves as a light guide means in the superresolution observation mode is at least twice that in the normal observation; however, the present invention is not limited to this configuration. As long as the Airy disk diameter of a point image of an irradiated portion of a sample S is at least twice the diameter of the aperture so that superresolution components can be obtained in the superresolution observation mode, any projection magnification can be set for the lens group 12 of the intermediate scaling optical system 10. To ensure some brightness during the normal observation mode, the intermediate scaling optical system 10 only needs to be set to a lower magnification than the projection magnification of an intermediate image in the superresolution observation mode. The intermediate scaling optical system 10 may include two or more optical systems with different projection magnifications and switch between these optical systems.

Figure 6:
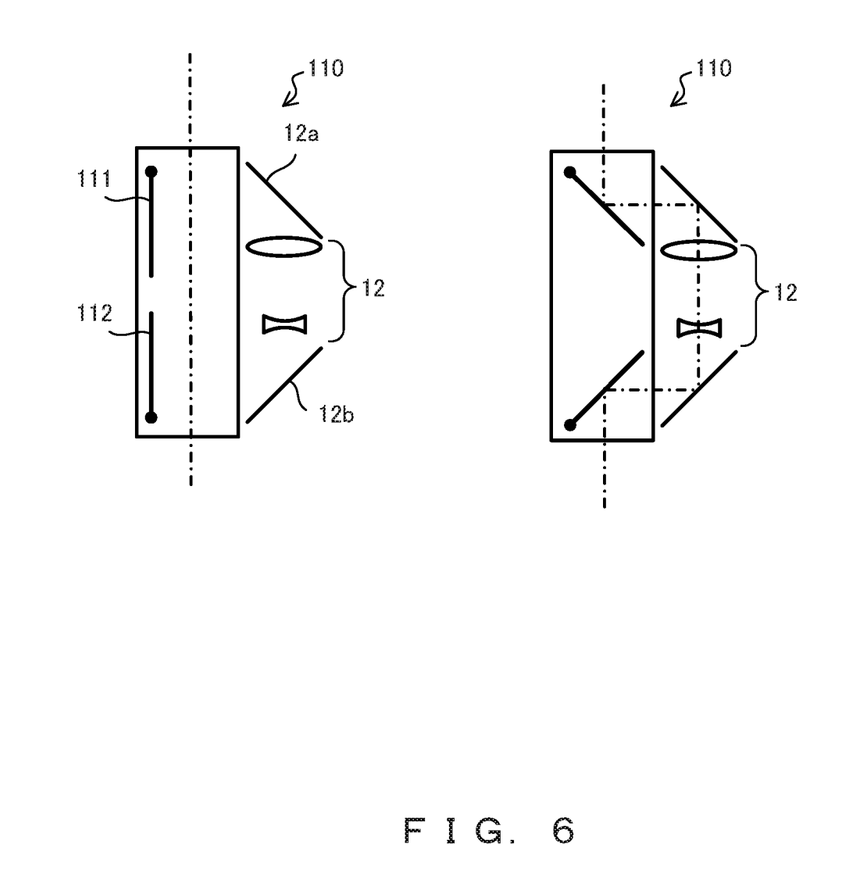
FIG. 6 illustrates operations of an intermediate scaling optical system in accordance with a variation.

Besides the configuration with a plurality of optical paths depicted in FIGS. 1 and 2, the intermediate scaling optical system 10 may have a configuration depicted in FIG. 6. FIG. 6 illustrates the configuration of an intermediate scaling optical system 110 in accordance with a variation. The intermediate scaling optical system 110 includes mirrors 111, 112, 12a, and 12b and a lens group 12. The mirrors 12a and 12b and the lens group 12 are similar to those depicted in FIG. 2. The mirrors 111 and 112 are movable mirrors connected to a motor (not illustrated) and are each rotationally moved with one end thereof serving as a fixed axis. These mirrors are rotated as indicated on the right and left sides of FIG. 6, which depict exemplary operations.

When the disk scanning microscope system 100 includes the intermediate scaling optical system 110, a projection magnification is switched by rotating the mirrors 111 and 112. The intermediate scaling optical system 110 allows the projection magnification to be switched with less energy than energy that would be required for driving to move the base 11. The influence of vibrations associated with movement of components that could be imposed on the intermediate scaling optical system 110 is smaller than the influence of vibrations that could be imposed on the intermediate scaling optical system 10.

Figure 7:
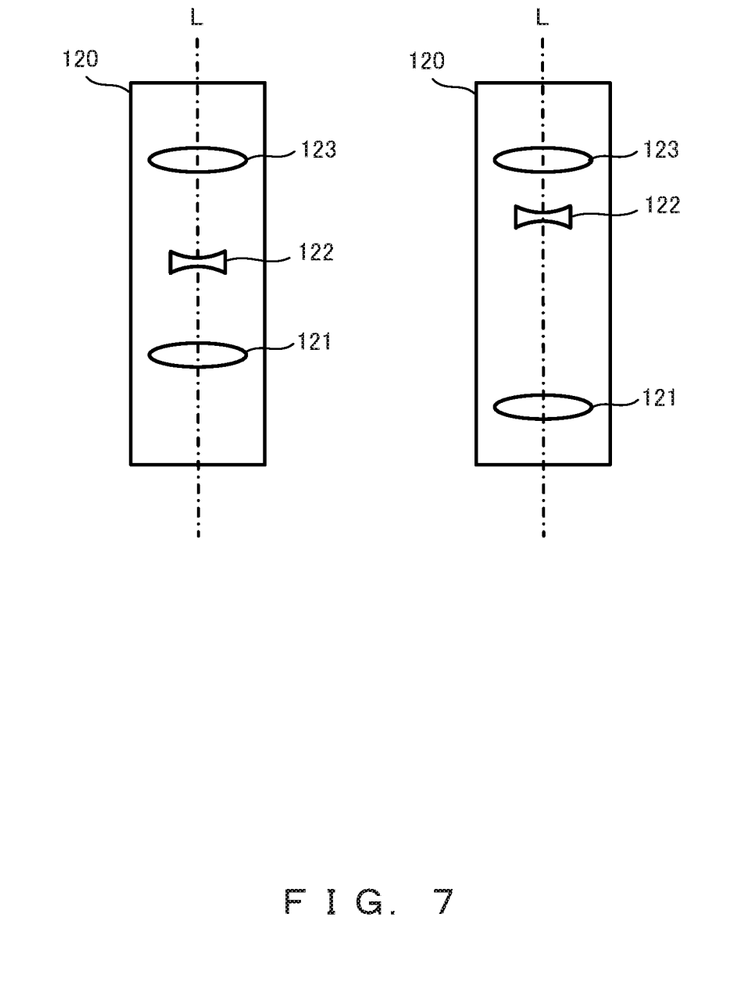
FIG. 7 illustrates operations of an intermediate scaling optical system in accordance with another variation.

The intermediate scaling optical system 10 may have a configuration depicted in FIG. 7. FIG. 7 illustrates the configuration of an intermediate scaling optical system 120 in accordance with a variation. The intermediate scaling optical system 120 includes lenses 121, 122, and 123. At least one of the lenses 121, 122, and 123 is shifted in location on the optical path by a motor. The lenses 121-123 function as a zoom lens together so that any projection magnification can be set for a certain range, thereby enhancing the flexibility of the system.

When the disk scanning microscope system 100 includes the intermediate scaling optical system 120, a projection magnification is switched by moving the lens 122. The intermediate scaling optical system 120 also allows the projection magnification to be switched with less energy than energy that would be required for driving to move the base 11. Moreover, instead of using a zoom lens, the lens system may be simplified into a configuration that includes a varifocal lens, i.e., a lens wherein an image-formed position is maintained only when a certain projection magnification is set.

The described embodiments is capable of providing a disk scanning microscope system that allows a superresolution observation and a normal observation to be performed while switching between these observations and that eliminates the need for a user to make cumbersome adjustments.

The embodiments described above indicate specific examples to facilitate understanding of the invention, and the present invention is not limited to those embodiments. Various modifications or changes can be made to the disk scanning microscope systems and computer-readable recording media described above without departing from the invention recited in the claims.

The invention claimed is:

1. A disk scanning microscope system comprising:
an imaging optical system that forms at least an optical image of an observed object by receiving light from the observed object;
a control apparatus that switches, based on an input from a user, between a superresolution observation mode for performing a superresolution observation and a normal observation mode for performing a normal observation, and that controls the imaging optical system according to a selected mode;
a rotatable disk located at a position conjugate to a front focal position of the imaging optical system and having a plurality of apertures formed in a surface of the disk, the surface of the disk serving as a light blocking section;
an image capturing apparatus that captures an image of the observed object, the image capturing apparatus being more distant from the observed object than the disk is and being located at a position conjugate to the front focal position of the imaging optical system; and
a light source unit that illuminates the observed object, wherein:
the imaging optical system includes an intermediate scaling optical system that changes a projection magnification of an intermediate image that is a point image of a portion of the observed object that is formed on the disk,
the control apparatus sets, during the superresolution observation mode, the projection magnification of the intermediate image in a manner such that the intermediate image becomes at least twice as large as the apertures and sets, during the normal observation mode, the projection magnification of the intermediate image in a manner such that the projection magnification becomes lower than the projection magnification of the intermediate image in the superresolution observation mode,
during the superresolution observation mode, the control apparatus performs a process of highlighting frequency components within the image captured by the image capturing apparatus that exceeds a cutoff frequency of the imaging optical system, and
the control apparatus defines an intensity of illumination of the light source unit and an exposure time of the image capturing apparatus for each of the normal observation mode and the superresolution observation mode and sets the intensity of illumination of the light source unit and the exposure time of the image capturing apparatus to the defined exposure time and intensity of illumination in accordance with switching between the normal observation mode and the superresolution observation mode.

2. The disk scanning microscope system of claim 1, wherein the control apparatus sets the projection magnification of the intermediate scaling optical system during the normal observation mode in a manner such that the intermediate image has a substantially same size as the apertures.

3. The disk scanning microscope system of claim 2, wherein the intermediate scaling optical system switches between two or more optical systems each for forming an intermediate image on the disk at a different projection magnification.

4. The disk scanning microscope system of claim 2, wherein the intermediate scaling optical system includes a zoom lens.

5. The disk scanning microscope system of claim 1, wherein the intermediate scaling optical system switches between two or more optical systems each for forming an intermediate image on the disk at a different projection magnification.

6. The disk scanning microscope system of claim 1, wherein the intermediate scaling optical system includes a zoom lens.

7. The disk scanning microscope system of claim 1, wherein the control apparatus defines the intensity of illumination of the light source unit and the exposure time of the image capturing apparatus for each of the normal observation mode and the superresolution observation mode such that the image capturing apparatus captures images with a defined luminance value in both the normal observation mode and the superresolution observation mode.

8. A disk scanning microscope system comprising:
an imaging optical system that forms at least an optical image of an observed object by receiving light from the observed object;
a control apparatus that switches, based on an input from a user, between a superresolution observation mode for performing a superresolution observation and a normal observation mode for performing a normal observation, and that controls the imaging optical system according to a selected mode;
a rotatable disk located at a position conjugate to a front focal position of the imaging optical system and having a plurality of aperatures formed in a surface of the disk, the surface of the disk serving as a light blocking section;
an image capturing apparatus that captures an image of the observed object, the image capturing apparatus being more distant from the observed object than the disk is and being located at a position conjugate to the front focal position of the imaging optical system; and
a light source unit that illuminates the observed object, wherein:
the imaging optical system includes an intermediate scaling optical system that changes a projection magnification of an intermediate image that is a point image of a portion of the observed object that is formed on the disk,
the control apparatus sets, during the superresolution observation mode, the projection magnification of the intermediate image in a manner such that the intermediate image becomes at least twice as large as the aperatures and sets, during the normal observation mode, the projection magnification of the intermediate image in a manner such that the projection magnification becomes lower than the projection magnification of the intermediate image in the superresolution observation mode,
the control apparatus sets the projection magnification of the intermediate scaling optical system during the normal observation mode in a manner such that the intermediate image has a substantially same size as the aperatures,
during the superresolution observation mode, the control apparatus performs a process of highlighting frequency components within the image captured by the image capturing apparatus that exceed a cutoff frequency of the imaging optical system, and the control apparatus defines an intensity of illumination of the light source unit and an exposure time of the image capturing apparatus for each of the normal observation mode and the superresolution observation mode and sets the intensity of illumination of the light source unit and exposure time of the image capturing apparatus to the defined exposure time and intensity of illumination in accordance with switching between the normal observation mode and the superresolution observation mode.

9. The disk scanning microscope system of claim 8, wherein the control apparatus defines the intensity of illumination of the light source unit and the exposure time of the image capturing apparatus for each of the normal observation mode and the superresolution observation mode such that the image capturing apparatus captures images with a defined luminance value in both the normal observation mode and the superresolution observation mode.

10. The disk scanning microscope system of claim 8, wherein the intermediate scaling optical system switches between two or more optical systems each for forming an intermediate image on the disk at a different projection magnification.

11. The disk scanning microscope system of claim 8, wherein the intermediate scaling optical system includes a zoom lens.

12. A non-transitory computer-readable recording medium having stored therein a program for causing a control apparatus to execute a process, the process comprising:

controlling an imaging optical system according to a selected mode from a superresolution observation mode for performing a superresolution observation and a normal observation mode for performing a normal observation, the imaging optical system switching, based on an input from a user, between the superresolution observation mode and the normal observation mode, the imaging optical system forming an optical image of an observed object by receiving light from the observed object, the imaging optical system including an intermediate scaling optical system that changes a projection magnification of an intermediate image that is a point image of a portion of the observed object that is formed on a rotatable disk, the disk being located at a position conjugate to a front focal position of the imaging optical system and having a plurality of apertures formed in a surface of the disk, the surface of the disk serving as a light blocking section;

setting, during the superresolution observation mode, the projection magnification of the intermediate image in a manner such that the intermediate image becomes at least twice as large as the apertures, and setting, during the normal observation mode, the projection magnification of the intermediate image in a manner such that the projection magnification becomes lower than the projection magnification of the intermediate image in the superresolution observation mode;

controlling an image capturing apparatus to capture an image of the observed object, the image capturing apparatus being more distant from the observed object than the disk is and being located at a position conjugate to the front focal position of the imaging optical system, and the observed object being illuminated by a light source unit;

during the superresolution mode, performing a process of highlighting frequency components within the image captured by the image capturing apparatus that exceed a cutoff frequency of the imaging optical system; and defining an intensity of illumination of the light source unit and an exposure time of the image capturing apparatus for each of the normal observation mode and the superresolution observation mode and setting the intensity of illumination of the light source unit and the exposure time of the image capturing apparatus to the defined exposure time and intensity of illumination in accordance with switching between the normal observation mode and the superresolution observation mode.

* * * * *